United States Patent [19]

Houston

[11] 4,344,078

[45] Aug. 10, 1982

[54] INTEGRATED WAVEGUIDE DROP SENSOR ARRAY AND METHOD FOR INK JET PRINTING SYSTEM

[75] Inventor: Robert D. Houston, Marion, N.Y.

[73] Assignee: Xerox Corporation, Stamford, Conn.

[21] Appl. No.: 204,433

[22] Filed: Nov. 6, 1980

[51] Int. Cl.³ .............................................. G01D 18/00

[52] U.S. Cl. ........................................ 346/75; 250/227

[58] Field of Search .............. 346/75; 350/96.24, 96.1, 350/96.16, 96.2; 250/227

[56] References Cited

U.S. PATENT DOCUMENTS

| | | | |
|---|---|---|---|
| 3,950,074 | 4/1976 | Tanaka | 350/96 B |
| 4,255,754 | 3/1981 | Crean et al. | 346/75 |

OTHER PUBLICATIONS

"Organic Materials for Integrated Optics", *Optical and Quantum Electronics* 7(1975), pp. 465–473, H. P. Weber et al.

U.S. Serial No. 21,420, filed 3/19/79, P. Crean et al.

*Primary Examiner*—Gene Z. Rubinson
*Assistant Examiner*—S. D. Schreyer

[57] ABSTRACT

A continuous drop, electrostatic deflection ink jet or liquid drop printing system is disclosed. An integrated waveguide or optical fiber drop sensor array is positioned adjacent a target to be printed on the upstream side. A test gutter is positioned on the downstream side of the target. The sensor array is normally used when a target is not in position for printing to calibrate the charging voltages for a plurality of drop streams. The object is to compose a straight or print line with segments of the line being composed by each of the plurality of drop streams. The sensor array includes two optical fiber sensors for each drop stream made up of an input fiber spaced from two output fibers called A and B fibers. Groups of the A and B fibers are terminated at common photodetectors requiring the A and B fibers to cross each other's paths. This is achieved in an integrated waveguide structure by fabricating the A fibers in one plane and the B fibers in a second plane.

24 Claims, 20 Drawing Figures

INTEGRATED WAVEGUIDE DROP SENSOR ARRAY AND METHOD FOR INK JET PRINTING SYSTEM

BACKGROUND

This invention relates to ink jet or liquid drop printing systems. More specifically, this invention relates to improved method and apparatus for optically detecting the accuracy of drop placement on a target and for other drop sensing or detecting goals.

Peter Crean and Paul Spencer disclose in their U.S. Pat. No. 4,255,754 Ser. No. 21,420, filed Mar. 19, 1979 a drop sensor using optical fiber pairs to sense drops in flight toward a target. The sensor typically includes an input fiber that is coupled to a light source at a remote end. The free or light emitting end is generally spaced from and centered to the free ends or light collecting ends of pair of output fibers (called A and B fibers herein). The remote ends of the output fibers are coupled to separate photodetectors. The photodetectors are in turn coupled to a differential amplifier.

The light collecting ends of the A and B fibers are oriented along the x axis of an x, y and z axis orthogonal coordinate system. The drops travel along a flight path generally in the z direction. The target to be printed lies generally in the x-y plane and is moving generally in the y direction. The shadow of a drop flying between the input fiber and the A and B output fibers generates an electrical positional signal from the differential amplifier. If the drop shadow falls evenly (or some other reference criteria) onto the collecting faces of the A and B fibers the drop is aligned to the bisector between the two fibers. This, of course, in the orientation described, corresponds to a precise point, e.g. $x_o$, along the x axis of the coordinate system. If the drop shadow is unbalanced on either the A or B fiber, a plus or minus position signal is generated by the differential amplifier. The magnitude of the position signal indicates a precise position left or right on the x axis of $x_o$. Typically, the position signal is coupled back to a drop charging and deflection mechanism to servo the drops directly over the $x_o$ position.

The Crean et al patent describes the use of the optical fiber sensors to calibrate drop charging levels for a plurality of drop streams. This process enables drops from each stream to be precisely positioned to multiple pixel positions within a segment of a scan or print line that extends across the target. Consequently, the print line segments of the adjacent drop streams are said to be "stitched."

Other multiple drop stream liquid drop systems also have need for detecting the position of a drop relative to a reference point or line. An example is the binary drop printing system of the type disclosed in U.S. Pat. No. 3,373,437 to Sweet and Cumming. Systems of this type continuously generate a plurality of drops in flight toward a target. The drops from each stream are able to reach only a single pixel within a scan line on the target. The drops not intended for the target are collected in gutter. The binary aspect is therefore the alternate selection of each drop in a stream for flight to the intended pixel on a target or collection in a gutter.

Drop position sensing in the above and other types of liquid drop systems is important for checking drop velocity and charge phasing as well as drop location. Generally, it is more useful to sense charged rather than uncharged drops because their trajectories are usually correctable by altering the charge on a drop prior to its flight through an electrostatic deflection field. However, the liquid pressure in the drop generator can be varied to affect the trajectory of the uncharged drops.

The Crean et al optical fiber sensors involve a large number of fibers with the A and B fibers being separated into groups for termination at first and second photodetectors. All (or a large number of) the A fibers share the same first photodetectors and all (or a large number) of the B fibers share the same second photodetectors. Since the light collecting ends of the plural sets of A and B fibers lie in the same x-y plane, the A fibers must cross over the B fibers for the two types to be grouped together. That is, the fibers are organized into groups that intersect each other thereby necessitating that the A fibers be crossed over the B fibers or vice versa. This can be done with individual fibers but makes for difficult assembly of large numbers of sensors. Heretofore, the cross-over problem has made integrated waveguide structures impractical for sensing arrays.

SUMMARY

Accordingly, it is a main object of this invention to overcome limitations of assembly of multiple fiber drop sensors employed in liquid drop printing systems.

Specifically, it is an object of the invention to organize the A and B optical fibers of the Crean et al type of sensor array into non-intersecting groups of A and B fibers to improve the manufacturability of the array while preserving the sensing function of the individual fibers.

Yet another object here is to employ laminar optical fiber structures in sensor arrays of the type disclosed in the Crean et al patent.

The above and other objects of this invention are realized by offsetting the light collecting ends of each A and B fiber into parallel and separate planes, at least at the sensing zone. In one embodiment, the A fibers of multiple fiber pairs are formed on a support surface of a single substrate member. The A fibers are coated over with an appropriate separation material creating a second support surface. The B fibers are formed on this second support surface. In another embodiment, the A, B and input fibers are formed on separate substrates. The A and B fibers are then oriented at the sensing zone as explained.

Detection circuits coupled to the remote ends of the A and B fibers store the signals associated with a drop shadow striking the A and B fibers. The storage is provided because the two signals are generated at different times. The delay is due to the separation between the A and B fibers along the z axis, i.e. the direction of flight.

PRIOR ART STATEMENT

The above Crean et al patent, U.S. Pat. No. 4,255,754 discloses a support plate for a plurality of optical drop sensors. Each sensor shown in FIG. 5 includes four optical fibers 80, 81, 5 and 6 located at the N-S, E-W compass points in a V-shaped groove. The E-W pair of fibers 5 and 6 are the A and B fibers discussed above. The N-S pair of fibers 80 and 81 are for detecting the position of a drop in the direction of flight. The E and W fibers are brought to common photodetectors by simply crossing the fibers over each other to avoid the intersection of one by the other.

The N fiber 81 and an E fiber 6 are oriented at least at the sensing zone as described in this invention. However, the N and E fibers do not make a sensing fiber pair as reported here. In addition, the N and E fibers are crossed over other fibers to reach a photodetector whereas that result is avoided in this invention. Rather, the fibers in the present systems are maintained on non-intersecting surfaces. This means that the fibers can pass in space above or below other fibers thereby avoiding a crimp or bump where one fiber is folded over another.

U.S. Pat. No. 3,950,074 is illustrative of optical fibers formed into arrays. Individual fibers are laid out in rows between top and bottom substrates. The fibers are all parallel and as such the teachings of these types of disclosures bear little relevance to the present invention. The resultant array is either an optical image or a waveguide bar.

Integrated optical devices are discussed in an article by Weber, Tomlinson and Chandross titled "Organic Materials For Integrated Optics" at pages 465–473 of Optical and Quantum Electronics, Volume 7 (1975). Photoresist, photolocking, embossing and casting techniques for fabricating optical waveguides are discussed at pages 469–471. FIGS. 4, 5, 6 and 7 appearing on the same pages are also of interest. None of the disclosure, however, relates to the application of the waveguide structures to liquid drop detection systems as employed herein.

THE DRAWINGS

The foregoing and other objects and features of the present invention are apparent from the specification, claims and drawings taken alone or in combination. The drawings are:

FIGS. 8*a* through 8*e* illustrate various sensor embodiments, methods for forming an optical waveguide or optical fiber on a substrate and methods for forming a sensor of the present invention. The photoresist method of fabrication is one method represented by these figures.

Figure 9:
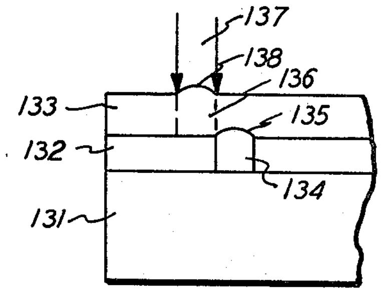

FIG. 9 illustrates another sensor embodiment and a photolocking method for fabricating a sensor of the present invention.

Figure 10A:
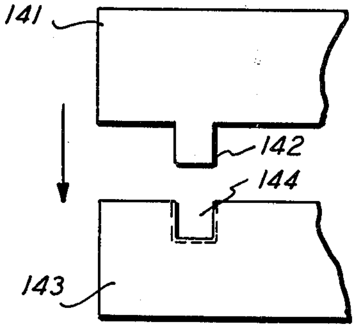
Figure 10B:
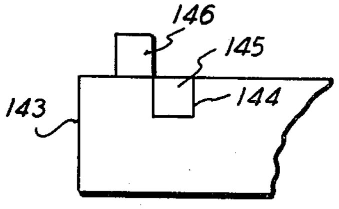
Figure 10C:
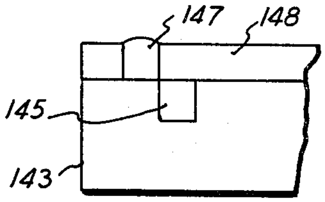

FIGS. 10*a*, 10*b* and 10*c* illustrate various sensor embodiments and embossing methods for fabricating sensors of the present invention.

Figure 11:
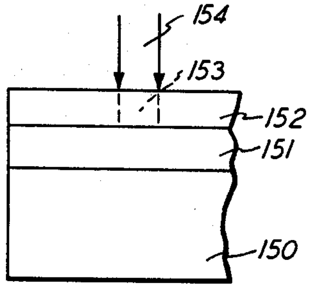

FIG. 11 illustrates methods of forming an optical fibers on a substrate having a coating that is the cladding material for the fiber or waveguide core.

Figure 12:
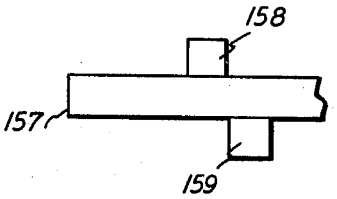

FIG. 12 illustrates yet another embodiment of a sensor and a method of fabrication of a sensor of the present invention.

Figures 5, 13:
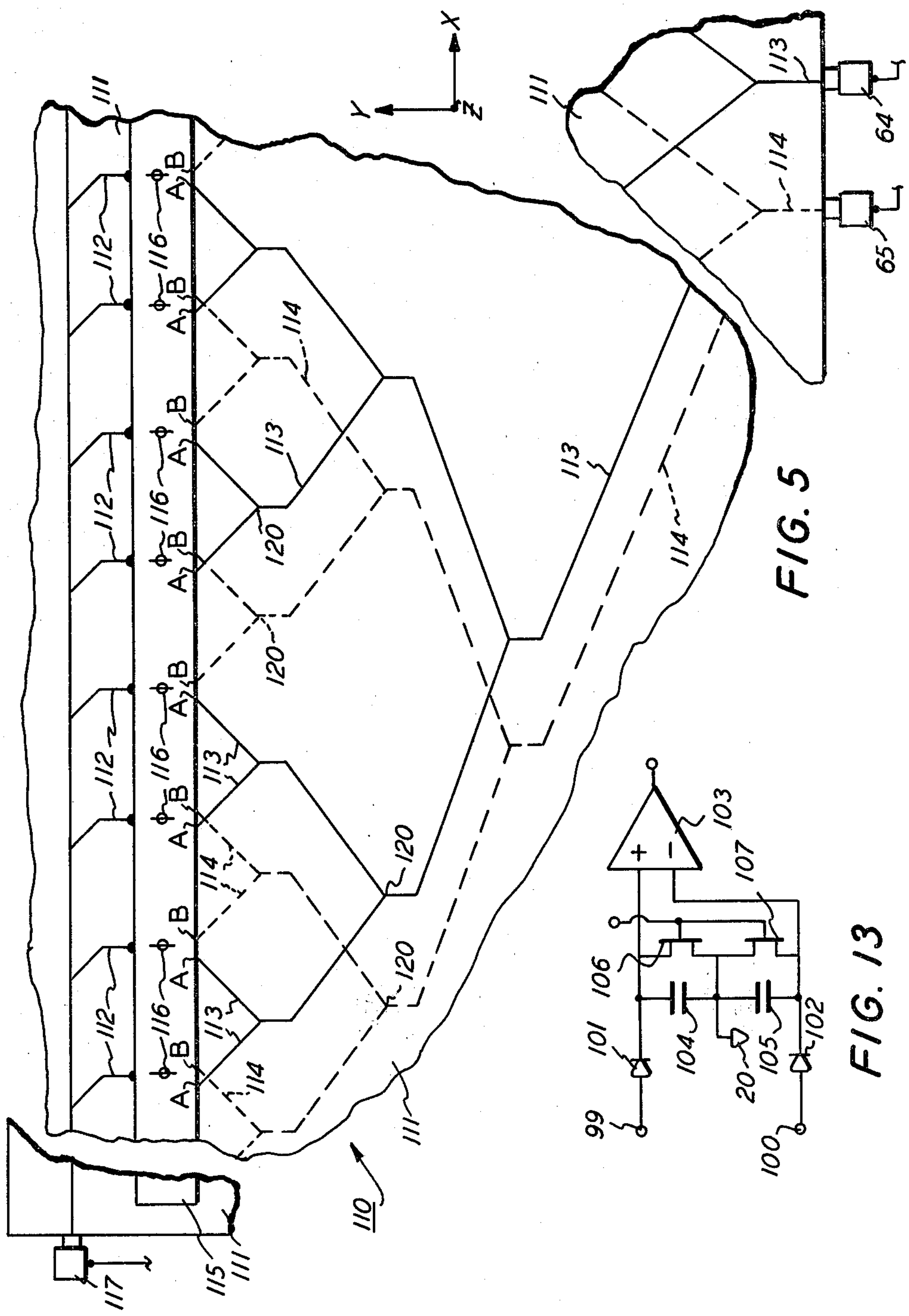
FIG. 5 is a schematic view of another embodiment of an optical fiber drop sensor array of the present invention.

FIG. 13 is a circuit diagram for means for storing the output signals generated by the photodetectors coupled to the A and B fibers of a drop sensor.

Figure 14:
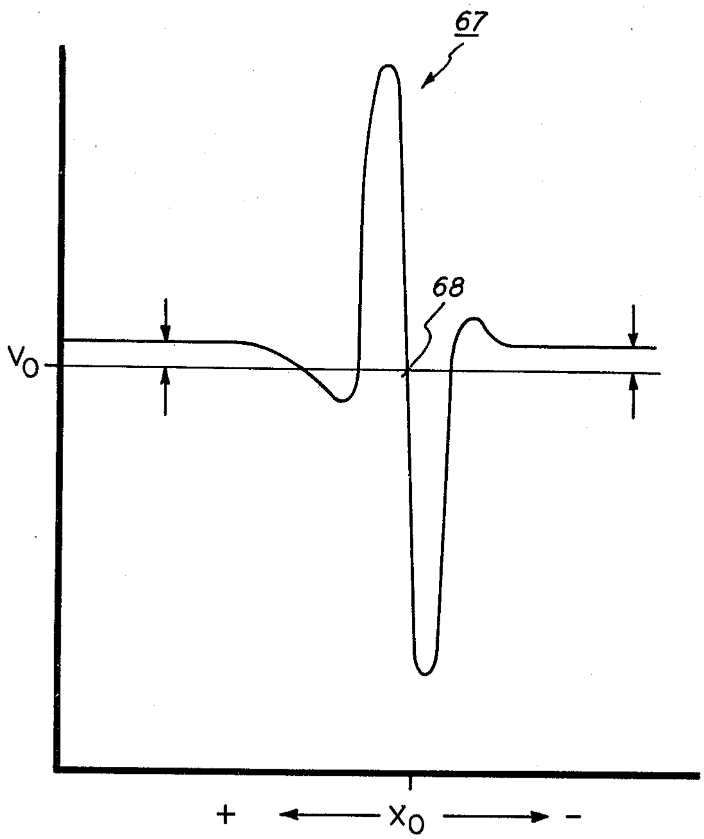

FIG. 14 is a graph of a curve representing the output of a differential amplifier to which the output signals of the photodetectors coupled to the A and B fibers are applied.

DETAILED DESCRIPTION

The terms "fiber" and "waveguide" are used interchangeably throughout. Both terms are intended to define members capable of transmitting electromagnetic radiant energy over a desired path including a core material and a cladding material.

Figure 1:
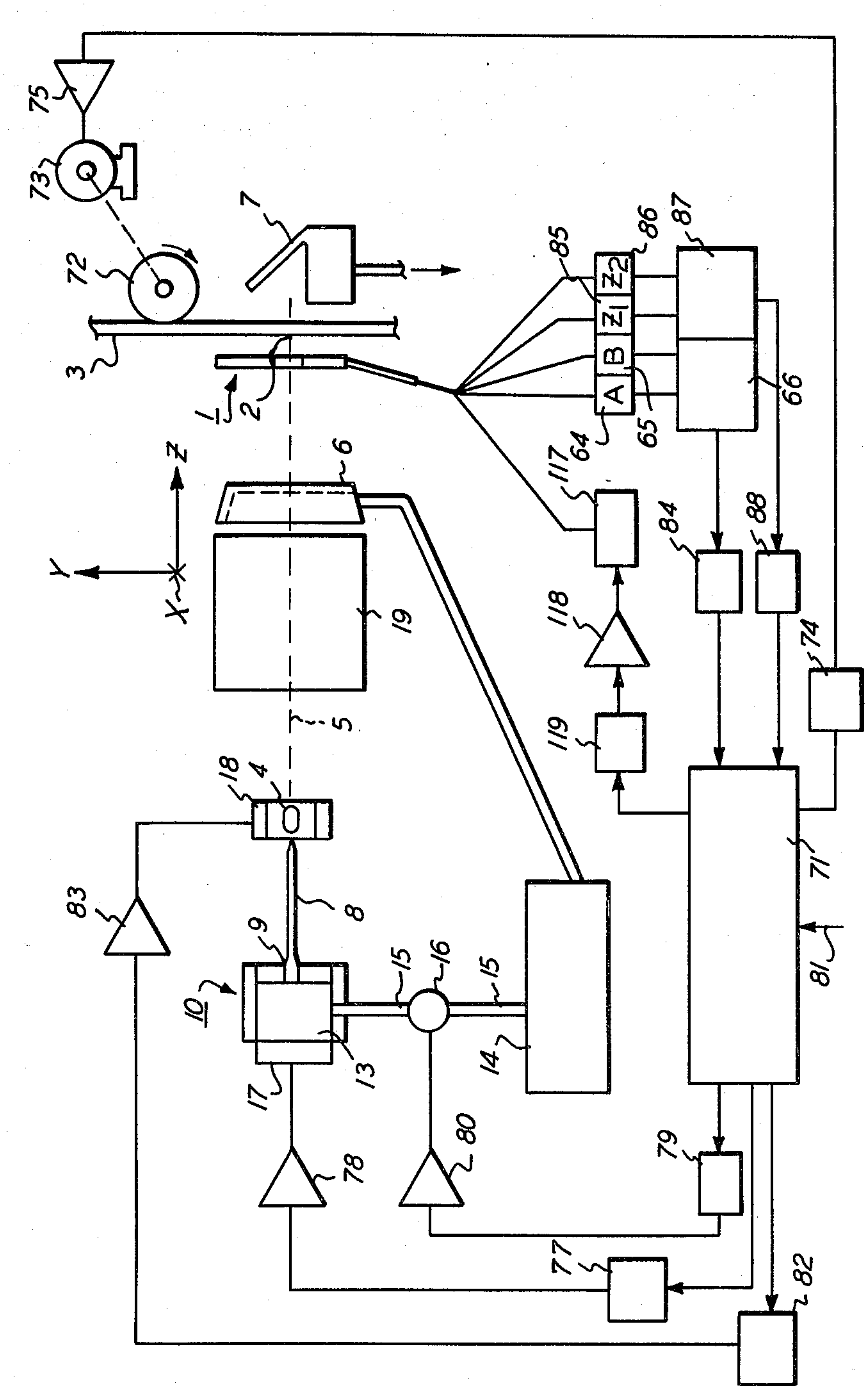
FIG. 1 is a schematic side view of a liquid drop printing system using the drop sensor array of the present invention.

FIG. 1 illustrates a liquid drop printer using an integrated waveguide or optical fiber array according to the present invention. The waveguide array is a device for detecting the location of drops in flight relative to the coordinates of an x, y and z orthogonal coordinate system. As used herein, the drops are in flight generally parallel to the z axis. A plurality of drop streams are described which all lie substantially within the same x-z plane. Printing is done in a raster pattern comprising multiple scan lines or print lines of pixels. A single drop is placed onto a single pixel. The role of the sensor is to insure that the drop placement relative to the pixels within a scan line are accurate. That is, any errors in placement detected by the sensor are corrected. As mentioned, velocity and other parameters are also available from the sensors.

The scan or print lines are deposited onto a target along the x axis while the target and drop streams move relative to each other along the y axis. The relative movement gives rise to the two dimensional raster image composed of multiple, parallel print lines. The presence or absence of a liquid drop at each pixel is the means by which an image is constructed.

In the system described, only x axis position information is sensed. It should be understood that y axis information is available by rotating the sensor in space by 90 degrees. The y axis sensor also has to be positioned at a location where it doesn't interfere with the flight paths of drops to a target.

The system of FIG. 1 is especially benefited by the present invention. It is of the type described by W. Thomas Warren in U.S. Pat. No. 4,238,804, now Ser. No. 16,256, filed Feb. 28, 1979. The Disclosures of this Warren patent and the Crean et al patent supra, are hereby expressly incorporated by reference. In the Warren patent, a plurality of drop streams collectively deposit drops at all the pixels within a scan line. Each drop stream addresses all the pixels within a scan line. The segments must be aligned to each other to create a continuous scan line across the target. The Warren patent discloses the use of an array of drop position sensors in a manner to insure the segment to segment alignment called "stitching". Capacitive drop sensors are disclosed in that patent. The Crean et al patent supra discloses optical fiber sensors for the Warren type printing system. This invention represents an advancement over both those patents.

Of course, the invention here is applicable to other types of liquid drop systems. One example is the multiple drop system of the type disclosed by Sweet and Cumming in U.S. Pat. No. 3,373,437. Single drop stream systems also benefit from the present invention since the various drop parameters are of interest.

Figure 2:
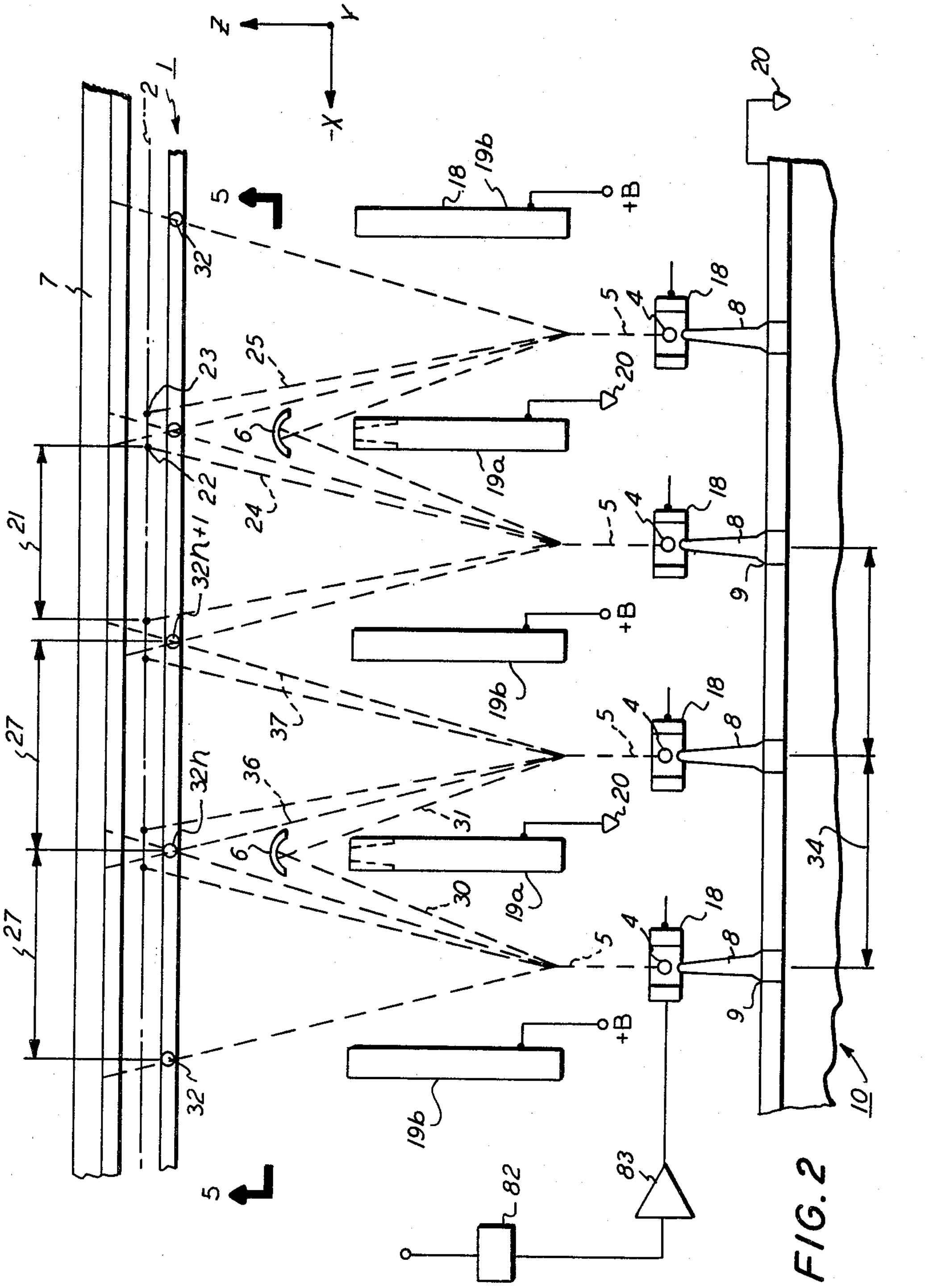
FIG. 2 is a partial, enlarged plan view of the system of FIG. 1 illustrating a location for the drop sensor array of the present invention.

The board 1 in FIGS. 1 and 2 includes the drop sensor array of this invention. It is positioned close to a print line 2 on the target 3. Liquid drops 4 in a drop stream represented by the dashed lines 5 fly toward the target to strike a given pixel within a print line 2 or to be deflected into a print gutter 6.

A test gutter 7 is located downstream of the target whereas the print gutters (there are multiple print gutters as is more evident in FIG. 2) are located upstream of the target. In the embodiment of FIG. 1, the sensor array 1 is normally employed only when the target is removed from the vicinity of the test gutter. The sensors are used to calibrate or adjust various system parameters affecting the drops 4.

The drops 4 are continuously generated from a liquid column 8 in a manner predicted by Lord Rayleigh. The column of liquid is issued from nozzles 9 in the drop generator 10. The generator includes a cavity or chamber 13 fluid coupled to a liquid ink reservoir 14 via the conduit 15 and sump 16. The pump supplies liquid to the chamber 13 under a pressure adequate to create the liquid column 8 from which the drops are formed. Typical fluid pressures are from 6 to over 100 psi.

The generator also includes a piezoelectric transducer 17 coupled to the liquid in the chamber 13. The piezoelectric device creates pressure variations within the liquid at a given frequency. These pressure variations in turn cause the drops 4 to form at the same rate, at a fixed distance from a nozzle 9 and with a uniform size and spacing.

The charging electrodes 18 (one for each drop stream) are located at the region of drop formation near the end of column 8. A voltage applied to an electrode 18 induces charge in the liquid column 8 which is trapped in a drop 4 when the drop breaks away from the column. Typically, the liquid is electrically grounded through the body of the generator 10 (the ground is not shown). Typical charging voltages are those within the range of ±150 volts.

Charged drops are deflected approximately in the x-z plane by an electrostatic field established between adjacent deflection electrodes 19*a* and *b*. The drops in the embodiment of FIG. 1 are deflected either to the print gutter 6 or to a pixel within the scan line 2 at the target 3. The deflection field is created between the deflection electrodes 19*a* and *b* by the ground 20 and +B potentials coupled to the electrodes. Typical deflection potential differences between the electrodes 19*a* and *b* are in the range from about 1500 to about 4000 volts.

Referring to FIG. 2, the sensor array 1 is spaced closely to the print line 2 on a target 3. (The target is not shown in FIG. 2.) During a printing operation, voltages are applied to the charging electrodes to affect a sweep of the drop stream the length of the segments 21 within the scan line 2. The points 22 and 23 represent adjacent pixels in the scan line located in adjacent segments 21. Of course, pixel 23 is addressed by a drop following trajectory 25 from the rightmost drop stream and pixel 22 is addressed by a drop following trajectory 24, the neighboring stream to the left. In a raster image printing system like that of FIGS. 1 and 2, it is essential that the drops from adjacent streams are "stitched", that is, aligned to the ideal pixel locations within scan line 2. Drops not intended for the target during a printing operation are charged to a level causing them to follow a trajectory intersecting a print gutter 6. The trajectories 30 and 31 are those followed by gutter drops in the two leftmost streams and are typical for other streams 5. One print gutter serves two drop streams. The drop following trajectory 30 is charged by a voltage of −150 volts, for example, applied to the neighboring charging electrode. Zero charge level drops flys a path to the trajectory unaffected by the deflection field between plates 19*a* and *b*. However, the zero charge level is not used unless it results in placement of a drop at one of the evenly spaced pixels within scan line 2.

The sensor array 1 is used for drop stitching. The array is an assembly including a plurality of drop sensors 32 spaced apart a fixed distance 27. The sensor spacing 27 is equal to that of the nozzle to nozzle spacing 34. The sensor spacing is chosen so that each drop stream can have drops deflected to trajectories in flight over at least two sensors. This is important for the stitching operation. A drop is charged by a voltage applied to a charging electrode 18 to cause it to fly trajectory 36 over sensor 32*n* (FIG. 2). Next a drop is charged by a voltage to cause it to fly trajectory 37 over sensor 32*n*+1. The electrostatic deflection process is approximately linear. Consequently, knowing the two voltages that position drops into precisely defined trajectories 36 and 37 means that all the pixels within a segment 21 can be accurately addressed by the charging and deflecting actions. Each drop stream is calibrated in this way to print or place drops at the ideal pixel locations within the line segment within its reach. The drop placement process is then "stitched" since the end pixel positions in adjacent segments each are able to have drops placed on them.

The number of sensors 32 equals the number of drop streams 5 plus one. Adjacent drop streams share a sensor but one more sensor than the number of drop streams is needed to provide two sensors for an end drop stream.

The stitching or calibration process need not be performed constantly. The charging voltages affecting aligned flight over the sensors hold steady for periods from second to tens of minutes. Consequently, it is adequate to reset or check the charging voltages at intervals. A convenient interval is that provided between completion of printing on one target and the start of printing on another target.

The test gutter 7 collects drops from all the nozzles 9 generated during the stitching process and other non-printing times. In this example, the test gutter 7 is located downstream of the target location because testing occurs during the intertarget time intervals. Alternatively, it is possible to provide a print gutter 6 for every drop stream instead of every other drop stream as used in FIG. 1. In that case, the sensors 32 would be positioned in front of the print gutters 6. Also, the test gutter can be located on the upstream side of the target. However, it must be raised and lowered relative to the drop streams so as not to interfere with the normal printing operation. Another option is to position the sensor array 1 on the downstream side of the target adjacent the test gutter.

It is presently preferred to position the sensor array 1 as close to the print line 2 on a target to give the best accuracy for the calibration process. It also presently preferred to locate the sensor on the upstream side to keep the area behind the target uncluttered as possible. The close spacing of the array 1 to the print line on the downstream side creates difficulties in the design of appropriate target transports. The test gutter 7 creates less of a mechanical problem for the target transport because it can be set back further from the print line 2 without any stringent alignment to the target. The two gutter scheme (print 6 and test 7) of FIG. 1 is very advantageous. The reasons include the fact that this scheme makes efficient use of the limited space between the deflection electrodes 19*a* and *b* and the target 3.

Figure 3:
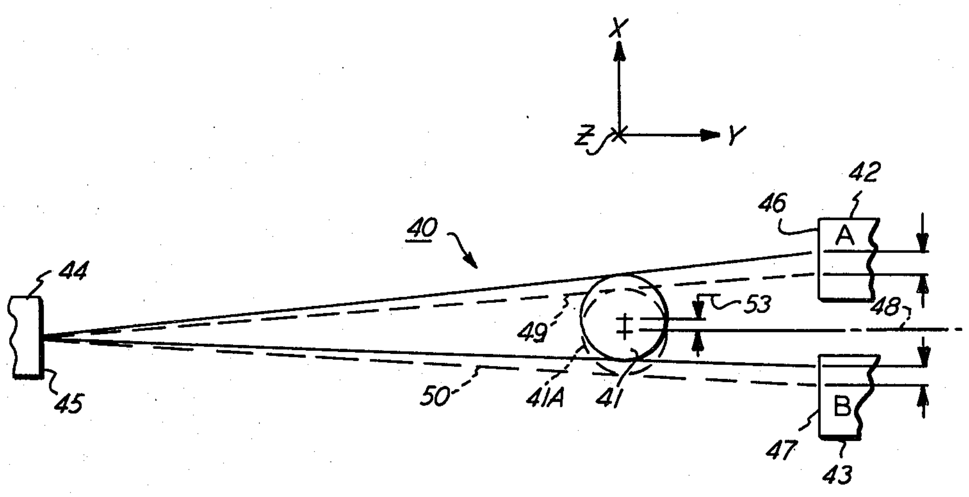
PRIOR ART FIG. 3
FIG. 3 is a view of a liquid drop in flight along the z axis within the sensing zone between a single input optical fiber and A and B output optical fibers of the prior art.

An individual sensor 40 of the present type is shown in FIG. 3. This is a prior art device. The x, y, z axes of the coordinate system are shown. A drop 41 is in flight along the z axis into the plane of the page. Two output optical fibers 42 and 43 are positioned along the x axis opposite an input optical fiber 44. The output fibers are referred to herein as the A (fiber 42) and B (fiber 43) output fibers. The input fiber has a light source (not shown) coupled to its remote end. The free end surface 45 of the input fiber emits light that illuminates the free end surfaces 46 and 47 of the A and B fibers. The drop sensing zone is the space between the free ends of the input and output fibers. When no drop is present, the light from the input fiber illuminates the A and B fibers uniformly or at least in a constant manner that defines a quiescent state. A drop, represented by the dashed line circle 41*a*, that is exactly aligned to the bisector 48 of the space between the A and B fibers diminishes the light (i.e. electromagnetic radiation) striking the fibers during the quiescent state by like amounts assuming equal illumination of the A and B fibers. The dashed lines 49 and 50 represent a shadow cast by the drop 41*a* onto the A and B fibers.

Drop 41 is misaligned to the bisector. Its shadow cast onto the A and B fibers is represented by solid lines 51 and 52. Fiber A receives less light than fiber B. The imbalance in light is used to measure the distance 53 along the x axis by which the drop 41 is offset from the bisector 48. This is done with photodetectors coupled to the remote ends of the A and B fibers. Errors in y position are sensed by rotating the sensor 40 fibers about the z axis by 90 degrees.

Figure 4:
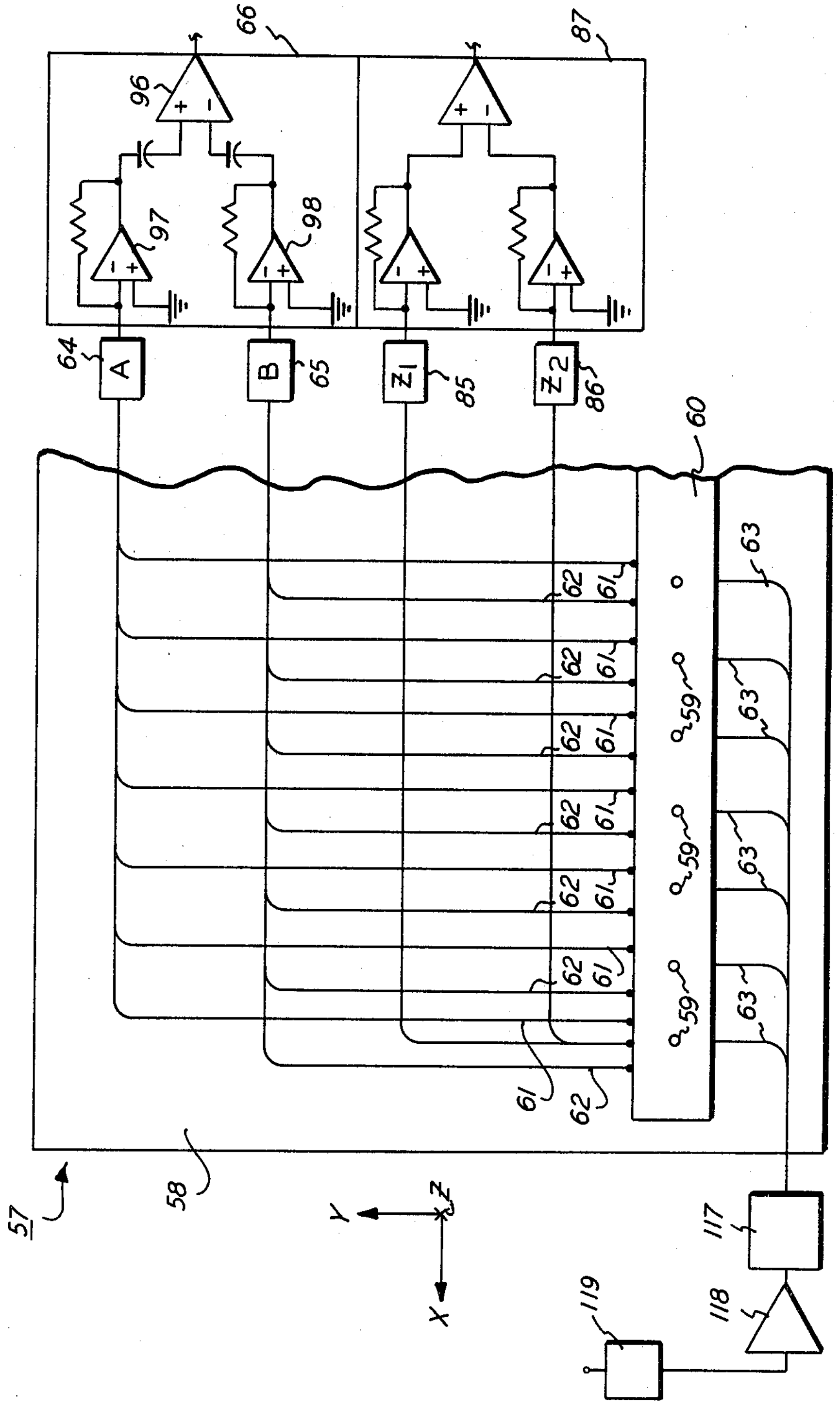
FIG. 4 is a schematic view of an optical fiber drop sensor array and of the means for generating electrical signals from the shadows cast onto the output fibers of a fiber optical sensor.

FIG. 4 shows the photodetectors and circuits used to process the light signals at the remote ends of the A and B fibers. The sensor array 57 in FIG. 4 includes a substrate 58 and a plurality of fibers formed on the substrate according to this invention which is discussed more fully in connection with FIGS. 5 through 12. A plurality of drop streams 59 are shown in flight through a hole 60 formed in the substrate 58 the A and B fibers of a plurality of sensors adjacent each drop stream are represented by lines 61 and 62. The input fibers for these sensors are represented by the lines 63.

Groups of the input lines are coupled to a common light source 117, e.g. a laser diode or a light emitting diode. The light source produces radiation that illuminates the faces of the A and B fibers. Groups of the A fibers 61 have their remote ends terminated at the photodetector 64 and groups of the B fibers 62 have their remote ends terminated at the photodetector 65. The photodetectors generate currents or voltages in response to the light from the input fiber. When no drop is in the sensing zone, or when a drop is aligned to the bisector 48 (FIG. 3), the signals from the two photodetectors are equal. When a drop is misaligned to a bisector 48, the output signals from the two photodetectors are different. That difference is proportional to the distance 53 (FIG. 3). The output signals are coupled to the differential amplifier 66. The amplifier 66 output is zero when a drop is aligned to the bisector 48 and is some plus or minus level if a drop is offset to the left or right of the bisector.

FIG. 14 shows a curve 67 of the output signal of amplifier 66. The vertical axis represents voltage and the horizontal axis represents displacement of a drop along the x axis. For stitching, the charging voltage is varied by a servo loop until alignment to the bisector 48 is achieved. The aligned condition occurs at the zero crossing 68 on curve 67. The voltages applied to subsequent drops in a drop stream are changed until the point 68 on curve 67 is reached. For a more detailed explanation, the reader is directed to the disclosure in the Crean et al. patent supra.

When A and B fibers are aligned along the z axis, velocity information can be obtained from the sensor. Again, the reader is referred to the Crean et al. patent for more information on that matter.

The drop servo loop and other electrical control for the printer of FIG. 1 is provided by the controller 71. The controller includes a microprocessor and appropriate auxiliary memory and interface circuits. It orchestrates the operation of the entire printing system of FIG. 1. It operates a target transport represented by the wheel 72 frictionally engaging the back side of target 3. The controller operates the motor 73 driving the wheel via the digital to analog converter (DAC) 74 and the amplifier 75.

The controller operates the drop generator by driving the piezoelectric transducer 17 via DAC 77 and amplifier 78 and the pump 16 via DAC 79 and amplifier 80. It receives and stores digital image or video data at its input 81. The video data is processed and applied to the plurality of charging electrodes at the correct time via DAC's 82 and amplifiers 83 coupled to each charging electrode 18.

The x axis drop position information from the sensor array 1 is fed to the controller 71 via the photodetectors 64 and 65 and their differential amplifier 66 (see FIG. 4). The output of amplifier 66 is converted to a digital format by the analog to digital converter (ADC) 84. Velocity or other information is fed from the z or y axis photodetectors 85 and 86, their differential amplifier 87 and the ADC 88.

Only two photodetectors are used for all the drop streams in this example. The controller runs the stitching operation. It tests each nozzle sequentially thereby allowing but two photodetectors to be used. The controller calculates numbers representative of voltages needed to place a drop at all the pixels within a segment. The calculation is based on the voltages that align the drops over the left and right sensors addressable by a stream. These numbers are likely to be unique for each drop stream.

Figure 6:
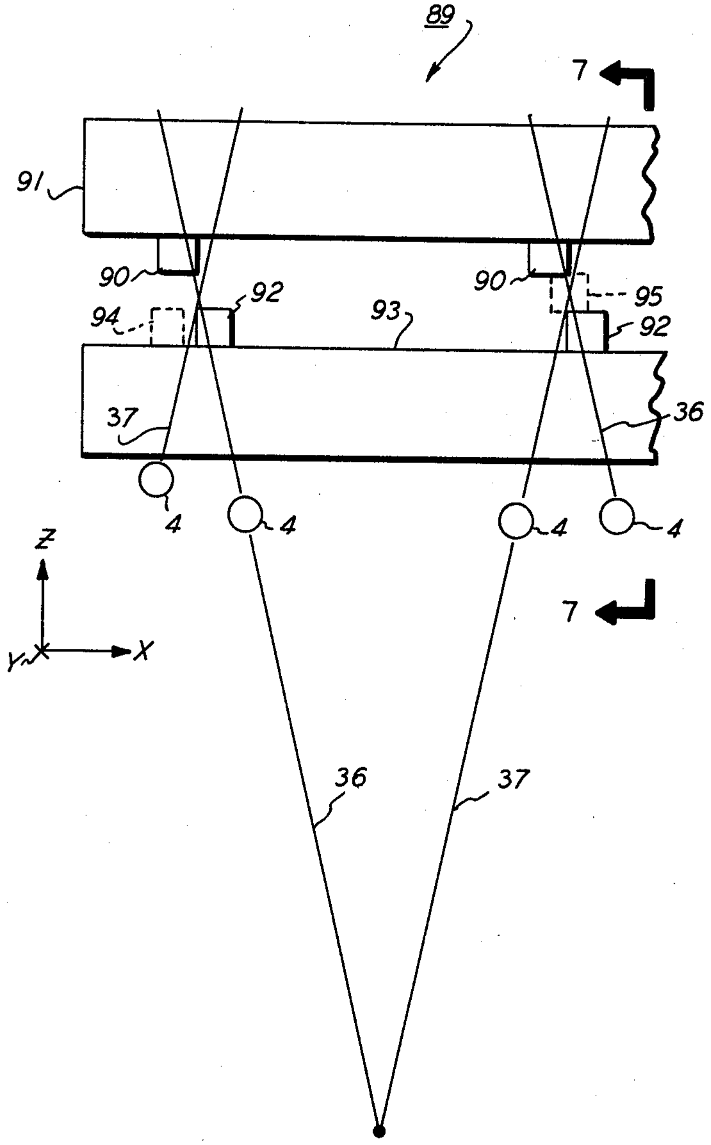
FIG. 6 is a schematic view of a drop sensor array according to this invention illustrating the A and B optical fibers of two adjacent sensors and drop trajectories that are aligned to the sensors.

A main feature of this invention is illustrated in FIG. 6. The feature is that the A and B fibers of a sensor pass each other in space without intersecting. FIG. 4 shows the problem. For the A fibers 61 to reach the A photodetector 64, the A fibers must cross over the B fibers 62. The prior art sensor 40 of FIG. 3 locates the A and B fibers 42 and 43 in the same x-y plane. One of the fibers have to be folded or placed over the other to reach the photodetector at their remote ends. This is not easily achieved with integrated waveguide fabrication methods.

The present invention solves the intersection problem by placing the A and B fibers into different x-y planes. This is achieved by displacing the A and B output fibers of a sensor along the z axis as well as along the x axis. Some displacement along x is necessary to develop an x axis position signal. The displacement along the z axis is necessary to locate the two fibers in separate x-y planes, at least at the region near the sensing zone.

The sensitivity of an optical fiber sensor of the present type is improved by the displacement of the A and B fibers in the z axis as well as the x axis. The reason is that the z displacement permits the A and B fibers to be offset along the x axis by a smaller amount. The sensitivity of an optical sensor is increased when the A and B spacing along the x axis is decreased. The slope of curve 67 (see FIG. 14) in the region including the zero crossing 68 increases when the x axis spacing is decreased.

When there is no z axis displacement between the A and B fibers, the closest the two fibers can be spaced along the x axis is an abutting position. Some cladding material should be present for separating the cores of the A and B fibers. However, when the fibers are also offset in z, the x axis separation between fibers can be much smaller than that of an abutting position. FIG. 6 shows the edges of the A and B fibers aligned along the x axis. Actually, the A and B fibers 90 and 92 can be moved closer together along the x axis into an overlapping arrangement. Of course, the limit to the overlapping is when the A fiber 90 is directly above the B fiber 92. In that case, there is a zero displacement between the A and B fibers along x and the fibers are no longer an x position sensor but solely a z position sensor.

In FIG. 6, a sensor array 89 is disclosed wherein A fibers 90 are coupled to substrate 91 and the B fibers 92 are coupled to substrate 93. The dash line box 94 represents the location of an A fiber according to the teaching of the prior art, that is, with a zero displacement between the A and B fibers along the z axis. It is clear that the arrangement represented by box 94 is not suited for running the fibers off in the x-y plane in directions in which they can intersect.

The dash line box 95 represents the ideal location of the input fiber face relative to the A and B fibers 90 and 92. That ideal location is a position at which optical symmetry is obtained relative to the faces of the A and B fibers.

The drops 4 in FIG. 6 are shown following the trajectories 36 and 37 discussed in connection with FIG. 2. These are the trajectories at which the drop streams are aligned to a sensor 32.

The displacement of the A and B fibers along the z axis requires that the output signals from the photodetectors 64 and 65 be stored. The storage is necessary for the amplifier 66 to produce a curve similar to curve 67 in FIG. 14. The outputs from the photodetectors 64 and 65 for the arrangement shown in FIG. 6 do not occur at the same time as they do in the case of a prior art sensor such as sensor 40 in FIG. 3. The drops fly past the B fiber 92 before flying past the A fiber 90 in FIG. 6. The electrical storage is made possible by use of the circuit in FIG. 13 in place of the amplifier 96 shown as part of the differential amplifier 66 in FIG. 4. The outputs of the photodetectors 64 and 66, actually the outputs of the current to voltage converting amplifiers 97 and 98, are applied to terminals 99 and 100 rather than to the plus and minus terminals of amplifier 96. The photodetector signals at terminals 99 and 100 are coupled via the diodes 101 and 102 to the plus and minus terminals of amplifier 103 (corresponding to amplifier 96 in FIG. 4). In addition, the outputs of the photodetectors 64 and 65 are coupled via the diodes to capacitors 104 and 105. The capacitors store the output signals produced by the photodetectors.

The FET's 106 and 107 are coupled in parallel to the storage capacitors to discharge the capacitors after a drop is sensed. The FET's are normally non-conducting. When the FET gates 108 and 109 are set to a state that turns on the FET's, the capacitors 104 and 105 quickly discharge to ground potential provided by the ground 20. The controller 71 operates the FET gates to discharge the capacitors to make the circuit ready for sensing another drop within the stream.

Because the sensor 89 in FIG. 6 has the A and B fibers 90 and 92 displaced along the z axis, a velocity signal is available by detecting the time difference between the outputs of the photodetectors 64 and 65. Also, it is normally adequate for a high quality velocity measurement to use the output of ether the A or B photodetectors 64 or 65 as a time mark. This time mark is compared to the time at which the charging voltage is coupled to the charging electrode 18 for the stream in question. The distance between the charging electrode 18 and sensor 32 is known, hence the average velocity of the drops in the stream is known. As indicated at the outset, the average drop velocity is varied by varying the pressure developed by pump 16 in the drop generator chamber 13.

The sensor array 110 in FIG. 5 illustrates the advantage of the present invention. The array 110 includes the substrate 111, the input fibers of waveguides 112 and the A and B output fibers or waveguides 113 and 114. A hole 115 is cut into the substrate 111 to permit flight of the drop streams 116 along the z axis toward a target 3. Light is supplied to the remote ends of the input fibers by the light emitting diode 117. The controller 71 activates the LED for proscribed periods of time via amplifier 118 and DAC 119.

The A fibers 113 are shown as solid lines and the B fibers 114 as dashed lines in FIG. 5 to emphasize that the A and B fibers lay in different x-y planes. As such, the A and B fibers are easily passed by each other left to right or right to left as shown. The specific layout is only an example. The layout of the A and B fibers in FIG. 5 has the advantage that the fibers are brought to the photodetectors 64 and 65 using y-shaped branches, for example the y-shaped branch 120. This assumes the fibers are formed as integrated waveguides on a substrate as is discussed more fully below. The y-branch is formed by merging two separate waveguides into one waveguide as illustrated.

Figure 7:
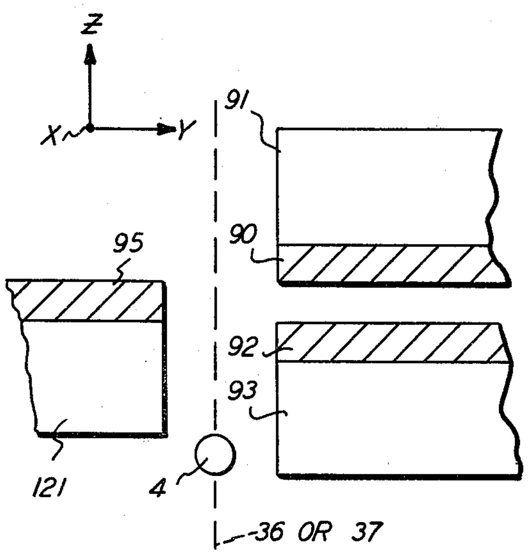
FIG. 7 is a side view of the array of FIG. 6 taken along lines 7—7 in FIG. 6 with an input light optical fiber shown aligned to the A and B fibers.

One method of fabricating the sensor arrays of this invention using separate substrates is to do so as indicated in FIGS. 6 and 7. Another method is to use a common substrate which is explained in connection with FIGS. 8*e*, 9, 10*c* and 12. FIG. 7 is a side view of FIG. 6 taken along lines 7—7 in FIG. 6. The input fibers 95 are carried on the substrate 121 opposite the A and B output fibers 90 and 92. All three substrates are positioned to align the fibers or waveguides 90, 92 and 95 as shown and explained. A base (not shown) is necessary to support the three substrates but is readily provided by any appropriate support structure. The fibers or waveguides for both the separate and common substrate structures are formed onto the substrates using a photoresist, photolocking, embossing or other known technique, some of which will now be discussed more fully.

A waveguide or optical fiber includes a core material coated with a cladding material. The index of refraction, Nc, of the core must be greater than that of the cladding, Ncl. Different cladding material may surround different surfaces of the core. The cladding having the highest index of refraction is dominant. Ambient air may be the cladding material on three sides of a four sided core if the fourth side has a cladding material with the appropriate index or refraction. Of course, the waveguides may have cross-sectional shapes other than the rectangular shapes shown.

Figure 8A:
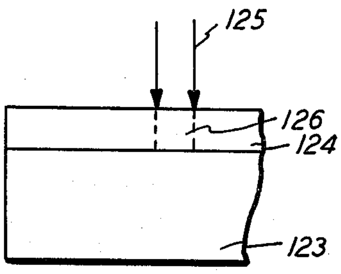
Figure 8B:
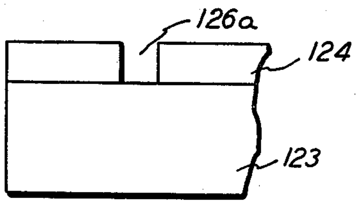

With the foregoing definitions, one photoresist method for construction of both separate and common substrate sensor arrays is explained by FIGS. 8*a–e*. in FIG. 8*a*, the substrate 123 has a thin photoresist 124 layer of about 2–3 mils coated onto it by appropriate means. Thereafter, the photoresist 124 is exposed to radiation 125 to which the layer 124 is responsive. The radiation is shaped in a pattern to correspond to the desired waveguide shape. For example, the exposure pattern of radiation 125 is that of the A fibers 113 in FIG. 5, y-shaped branches 120 included. After the exposure, the region 126 is rendered soluable to a given chemical bath. The substrate and photoresist are submersed in the bath and the region 126 of layer 124 is washed away leaving the structure shown in FIG. 8*b* having a groove 126*a*.

Next, the grooves created in layer 124 are filled with a core material 127 in a liquid state. The core material is cured or hardened in situ leaving the structure in FIG. 8*c*. The material 127 defines the A fiber of the sensors. The core material 127 has a higher index of refraction than the photoresist layer 124 which is the cladding material adjacent the sides of the core. The substrate is the cladding material at the bottom surface and air is the cladding material at the top surface.

Figure 8C:
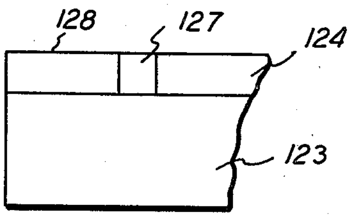
Figure 8D:
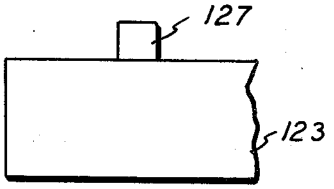
Figure 8E:
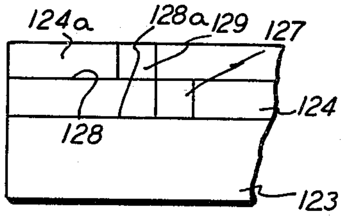

The B fibers are formed-for a single support embodiment-by repeating the steps of 8*a–c* on top of surface 128 on the structure in FIG. 8*c* to yield the structure of FIG. 8*e*. Alternatively, structures like that in FIG. 8*c* serve as the three separate members in the embodiment of FIG. 6. The difference is that a layer 124 surrounds both the A fiber 90 and the B fiber 92 of FIG. 6.

Another alternative is to process the member in FIG. 8*c* to produce the exact structure shown in FIG. 6. This is done by dissolving the photoresist material from around the core material 127. The resultant structure is that of FIG. 8*d*.

The structure of FIG. 8*e* is the presently preferred structure. As indicated above, the structure in FIG. 8*e* is constructed by repeating the steps of FIGS. 8*a—c* on surface 128. The photoresist layer 124*a* (FIG. 8*e*) is coated over surface 128. The region 129 is exposed to radiation in the form of the B fibers, for example, the fibers 114 in FIG. 5. The exposed region is chemically removed and filed with a core material 129. The core material 129 defines the B (or second) fiber for the sensor.

A definition generic to both the single and separate substrate embodiments can be based on the surfaces carrying the cores of the A and B fibers. First referring to the single support structure of FIG. 8*e*, the A fiber 127 is carried on or coupled to the first support surface 128*a*. Surface 128*a* is the top surface of substrate 123 on which the photoresist layer 124 was coated. The B fiber 129 is carried on or coupled to the second support surface 128. Surface 128 is the top surface of layer 124 which is mechanically a separation layer. That is, layer 124 separates the B fiber 129 relative to the A fiber 127 along the z axis.

Referring to FIG. 6, the A fiber 90 is carried by or coupled to a first support that is the bottom surface of the upper substrate 91. The B fiber 92 is carried on or coupled to a second support surface that is the top surface of the lower substrate 93.

Suitable photoresist material for the layers 124 and 124*a* are photopolymer materials available from E.I. duPont de NeMours Corporation of Wilmington, Delaware under the tradename Riston. Ristons are transparent materials that have indices of refraction of about 1.50. Riston is available in sheet form. A suitable core material 127 is an ultraviolet light setting polymer available from the Norland Products Incorporated of New Brunswick, New Jersey under the tradename NOA 61. NOA 61 has a refractive index of 1.56. A suitable substrate for all the discussed embodiments is cellulose acetate which has a refractive index less than 1.5.

FIG. 9 represents a photolocking process for fabricating sensor arrays according to the teaching here. Either separate or single substrate arrays are possible with the photolocking method. FIG. 9 represents a single substrate array embodiment. The substrate 131 has two layers 132 and 133 of a photolocking material over it. The layers are deposited sequentially. First layer 132 is formed on the substrate by coating the substrate with the photolocking material. The core material 134 of the A fiber is formed by exposing the photolocking layer 132 to pattern of actinic radiation in the shape of the A fibers, e.g. the fibers 113 in FIG. 5. The photolocking layers are polymers doped with a photosensitive, moderately volatile species. The exposed regions experience a photochemical reaction involving either dimerization of the dopant or attachment of the dopant to the polymer. In either event, the new species has a much reduced mobility. Thereafter, the exposed layer is heated to drive out the unreacted dopant. A thickness profile 135 is created by this step and because the dopant has a higher refractive index, a core region 134 is formed from the layer 132.

The B fibers 136 for structure of FIG. 9 are obtained by repeating the above steps by coating the photolocking material over layer 132 and curing it to give layer 133. The core 136 is created by exposing the layer 133 to actinic radiation 137 in the shape of the B fibers, e.g. the B fibers 114 of FIG. 5. A raised portion 138 is formed after the dopant in layer 133 is driven off by heating.

FIGS. 10*a–c* disclose an embossing process for fabricating a sensor array of this invention. Also, FIGS. 10*b* and *c* disclose a process for forming a sensor array using embossing in combination with photoresist or photolocking techniques. A metal die 141 is fabricated by known techniques with a raised pattern 142 in the shape of the A fibers 113 of FIG. 5, for example. The die is then pressed against a deformable thermopolymer layer 143. Layer 143, for example, poly(methyl methacrylate), is transparent and has a refractive index of about 1.49. The layer 143 is both the substrate and the cladding material for the core which is formed in the recesses 144 in layer 143. The recess, of course, is in the pattern of the die. The recess 144 is filled with a liquid polymer of a higher refractive index than substrate 143 and is cured in situ. The resultant structure is suited for the array of FIG. 6 as: the input waveguide comprising core 95 and the cladding substrate 121; the A waveguide comprising core 90 and the cladding substrate 91;

and the B waveguide comprising the core 92 and the cladding substrate 91.

Alternatively, single substrate sensor arrays are made as shown in FIGS. 10*b* and 10*c*, by way of example, The array of FIG. 10*b* includes the substrate 143 having the recess 144 filled with an A core material 145. That structure then has the B core material 146 formed on it as shown following the steps illustrated by FIGS. 8*a–d* and explained above. The array of FIG. 10*c* again has the A fibers, for example, formed by the substrate 143 and the core material 145. The B fibers are formed with a photolocking layer 148 exposed to actinic radiation and heated to create the B core regions 147. Clearly, the photoresist method of FIGS. 8*a–c* or 8*a–d* are able to produce a structure similar to that shown in FIG. 10*c* as an alternative to the photolocking process.

FIG. 11 discloses another possible variation for all the above processes wherein the substrate is not suitable as the waveguide cladding material. Here, an opaque, for example, substrate 150 is coated with a suitable liquid polymer and cured to form a cladding layer 151. The cladding layer is in turn coated with a photolocking layer 152. A waveguide core 153 is created by exposing layer 152 to actinic radiation 154 and by heating the exposed layer. Other similar structures are built to make a separate substrate array such as FIGS. 6 and 7. Alternatively, the structure of FIG. 11 is used to construct a single substrate sensor array by overcoating layer 152, exposing and heating the new layer to form the second core.

The structure in FIG. 12 is another variation of the structures of FIGS. 8–11. A cladding material substrate 157 has an A fiber 158, for example, formed on it—or "in" for the embossing example of FIG. 10*a*—its top surface. A second or B fiber, for example, is formed on—or "in" for the embossing example of FIG. 10*a*—the bottom surface of substrate 157. A and B fibers may also be formed on opposite sides of the same support using the photoresist and photolocking processes of FIGS. 8*e* and 9.

Casting techniques similar to the embossing process may also be used.

Whenever the single support sensor array structures are discussed above, it should be understood that the input fibers, for example, the waveguides 112 of FIG. 5, are formed during separate or simultaneous steps with the formation of either the A or B fibers 113 and 114. The hole 115 separates the input and output waveguides and enables each region on the two sides of the hole 115 to be treated differently. The input waveguides 112 are formed on the substrate 111 at an elevation that enables the free ends of the input fibers to illuminate the free ends of A and B fibers symmetrically. This generally means that the elevation of the input fibers are midway between that of the A and B fibers requiring the substrate thickness to be appropriately shaped in the input fiber region.

The above described sensor arrays can be made into complex geometric surfaces. They need not be planar. The A and B fibers are in parallel x-y planes at the sensing zone but can be curved into a desired configuration away from the sensing zone.

The thickness dimensions of the waveguides disclosed herein are selected to be generally near that of the drop diameters. Typical drop diameters for presently preferred printing systems are in the range of from 0.5 to 3 mils. The integrated waveguide techniques described here are capable of much smaller dimensions.

For example, waveguides having cross-section widths as small as 0.1 mils are well known. See the Weber et al article cited earlier. The substrate dimensions are in the order of 20–50 mils to give desired mechanical properties.

The foregoing is suggestive of many variations and modifications. All such variations and modifications are intended to be within the scope of this invention.

I claim:

1. Liquid drop apparatus for placing drops at specified locations on a target generally parallel to either the x axis of an x,y and z axes, orthogonal coordinate system comprising drop generating means for generating a plurality of drop streams generally in a z direction toward a target, means associated with each stream for deflecting droplets to said locations on said target, drop sensor means defining a sensing site associated with each drop stream for detecting the position of drops from said associated stream including cooperating A and B optical fibers having light collecting ends displaced from each other along the z and at least the x axis, said sensor means further including an input light means for transmitting light to the light collecting ends of the A and B fibers, means for supporting said fibers in a first x-y plane A and said B fibers in a second x-y plane at the sensing sites and routing said A and B fibers away from said sensing sites in non-intersecting groups, and means coupled to an output end of said A and B groups for comparing the light intensity transmitted by pairs of said cooperating A and B fibers to determine the position of said droplets from said stream.

2. The apparatus of claim 1 wherein said means for comparing comprises first and second photodetector means coupled to the remote ends of groups A and B fibers, respectively.

3. The apparatus of claim 1 wherein said means for supporting comprises first and second support surfaces to which are coupled respectively, groups A and B fibers.

4. The apparatus of claim 3 wherein the first and second surfaces are surfaces on upper and lower substrates respectively, with the substrates being generally parallel to each other and with the A and B fibers located between them in non-intersecting groups.

5. The apparatus of claim 3 wherein the first surface includes a cladding surface on a base member and the second surface includes a cladding surface on a separation layer coupled to the base member.

6. The apparatus of claim 1 wherein said A fibers are located within a separation layer adjacent a base member and said B fibers are located within an outer layer adjacent the separation layer.

7. The apparatus of claim 6 wherein said A fibers are located on the base member by a photoresist process and wherein said separation layer is added to be base member in regions not occupied by the A fibers.

8. The apparatus of claim 6 wherein said separation layer includes a photolocking material layered onto the base member and wherein said A fibers are located within the separation layer by optically exposing the separation layer to radiation that changes the index of refraction of the separation layer such that the region of higher index defines the A fibers.

9. The apparatus of claim 8 wherein said outer layer includes a photolocking material layered onto the separation layer and wherein the B fibers are located within the separation layer by optically exposing the outer layer to radiation that changes the index of refraction of the outer layer such that the region of higher index defines the B fibers.

10. The apparatus of claim 1 wherein said A fibers are located within slots formed in a free surface of a base member and wherein said B fibers are located on the free surface of the base member.

11. The apparatus of claim 1 wherein said input light means includes an optical fiber having an emitting end surface generally parallel to the collecting end surfaces of the A and B fibers and is spaced adjacent thereto.

12. The apparatus of claim 11 wherein said input light means and said A and B fibers are carried by a common base member.

13. The apparatus of claim 1 wherein drops are placed at a print line on a target generally parallel to the x axis and wherein said sensor means detect the position of drops within the streams relative to the x axis.

14. The apparatus of claim 13 wherein the drop generating means includes a linear array of nozzles for emitting under pressure liquid columns from which the drop streams are formed and further including drop charging means associated with each drop stream for charging drops, and wherein said means for deflecting deflect charged drops generally in an x direction such that drops from a single drop streams are placed at two or more pixel positions within a segment of the print line.

15. The apparatus of claim 14 wherein said sensor means are located relative to the drop streams to enable drops from each stream to fly past two separate sensor means.

16. The apparatus of claim 15 wherein the plurality of sensor means are aligned in a planar array at spacings corresponding to the nozzle to nozzle spacing.

17. The apparatus of claim 15 further including control means coupled to the charging means and to the sensor means for calibrating the charging levels required to align drops from the same stream to the two sensor means within the flight path of the drops within the stream.

18. The apparatus of claim 15 wherein the plurality of sensor means are closely spaced to the print line on a target.

19. The apparatus of claim 18 further including test gutter means located downstream of the target for collecting drops from all the streams when a target is not in the flight path of at least some of the drops in the drop streams.

20. The apparatus of claim 19 further including a plurality of print gutter means located upstream of the target for collecting drops following a gutter trajectory with the target is in the flight path of at least some of the drops in the drop streams.

21. The method of placing liquids drops on a target generally parallel to either the x axis of an x, y and z axes, orthogonal coordinate system comprising generating a plurality of drop streams located generally in an x-z plane in flight generally in the z direction toward a target, locating light collecting ends of cooperating A and B optical fibers adjacent each drop stream to detect the location of a drop relative to the x axis in response to flight between the light collecting ends and a light source, positioning the A and B fibers in first and second x-y planes at least near the light collecting ends and grouping the remote ends of the respective A and B fibers for coupling respectively to first and second photodetectors without the A and B fibers occupying intersecting paths in any direction in the said first and second x-y planes.

22. In an ink jet printer of the type wherein multiple ink nozzles spaced across a droplet generator direct multiple droplet streams toward a print medium, apparatus for sensing the movement of said droplet streams past sensing sites spaced across a printing width comprising multiple cooperating light carrying fiber pairs (A,B) spaced across said width with the number of pairs equal to the number of sensing sites, each fiber having an input end facing a sensing site and extending away from the site to an output location, the two fibers comprising each pair having their centers spaced along the direction of droplet travel to facilitate routing of said fiber pairs away from the sensing site without intersecting, and further having their centers spaced along a direction orthogonal to said path of travel, means for transmitting a light signal through said sensing sites to the input ends of the fiber pairs spaced across said width, and means for determining the position of droplets passing through said sensing site including means for converting light intensities transmitted by each cooperating fiber pair to electrical signals, means for storing said electrical signals and means for comparing said stored signals.

23. A method of forming an integrated ink droplet sensor array comprising the steps of fabricating a sensor substrate onto which light transmitting waveguides are to be formed, applying a layer of treatable material to said substrate to occupy a region through which the waveguides are to be positioned, treating specific portions of said layer to create regions of higher index of refraction than said treatable material so that said higher index regions comprise a light transmitting waveguide and said treatable material bounding said waveguide comprises a cladding material for said waveguide, said waveguide regions each including an input and output end, coupling output ends of said waveguide to means for sensing transmitted light intensities, and mounting said substrate so that the input ends of said waveguides transmit light from a plurality of sensing sites spaced along the substrate.

24. The method of claim 23 wherein said steps of applying and treating are performed twice to separate groups of said waveguides in different planes to route said groups to the means for sensing along non-intersecting paths.

* * * * *